United States Patent
Santaniello et al.

(10) Patent No.: US 9,785,374 B2
(45) Date of Patent: Oct. 10, 2017

(54) STORAGE DEVICE MANAGEMENT IN COMPUTING SYSTEMS

(71) Applicant: Microsoft Corporation, Redmond, WA (US)

(72) Inventors: Mark Santaniello, Redmond, WA (US); Badriddine Khessib, Redmond, WA (US); Laura Caulfield, Woodinville, WA (US); Bikash Sharma, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 225 days.

(21) Appl. No.: 14/496,078

(22) Filed: Sep. 25, 2014

(65) Prior Publication Data

US 2016/0092140 A1 Mar. 31, 2016

(51) Int. Cl.
*G06F 12/00* (2006.01)
*G06F 3/06* (2006.01)
*H04L 29/08* (2006.01)
*G06F 9/50* (2006.01)

(52) U.S. Cl.
CPC .......... *G06F 3/0647* (2013.01); *G06F 3/0611* (2013.01); *G06F 3/0683* (2013.01); *G06F 9/5088* (2013.01); *G06F 12/00* (2013.01); *H04L 67/1008* (2013.01); *H04L 67/1097* (2013.01); *G06F 3/0616* (2013.01); *G06F 3/0688* (2013.01)

(58) Field of Classification Search
CPC ...... G06F 12/00; G06F 3/0611; G06F 3/0616; G06F 3/0647; G06F 3/0683; G06F 3/0688; G06F 9/5088; G11C 16/349; H04L 67/1008; H04L 67/1097

USPC .................................................. 709/224-245
See application file for complete search history.

(56) References Cited

U.S. PATENT DOCUMENTS

| | | | |
|---|---|---|---|
| 6,615,316 B1 | 9/2003 | McKenney et al. | |
| 7,484,208 B1 * | 1/2009 | Nelson ............... | G06F 9/45558 711/6 |
| 8,010,738 B1 * | 8/2011 | Chilton ............... | G11C 16/349 711/103 |
| 8,341,332 B2 | 12/2012 | Ma et al. | |
| 8,364,923 B2 | 1/2013 | O'Brien et al. | |
| 8,639,877 B2 | 1/2014 | Benhase et al. | |

(Continued)

OTHER PUBLICATIONS

Roberts, David Andrew, "Efficient Data Center Architectures Using Non-Volatile Memory and Reliability Techniques", In PhD Thesis, Retrieved on: Jun. 17, 2014, 170 pages.

(Continued)

*Primary Examiner* — David Lazaro
*Assistant Examiner* — Berhanu Shitayewoldetsad
(74) *Attorney, Agent, or Firm* — Liang IP, PLLC

(57) ABSTRACT

Various techniques of managing storage devices in a computing system are described in this application. In one embodiment, a method includes receiving an input containing consumption data representing consumption of a storage device in one of the processing units and determining if the storage device in one of the processing units is consumed excessively. In response to determining that the storage device is consumed excessively, an indicator may be generated to indicate a potential program migration from the one of the processing units to another one of the processing units in the computing system.

19 Claims, 6 Drawing Sheets

(56) References Cited

U.S. PATENT DOCUMENTS

| | | |
|---|---|---|
| 2008/0126720 A1 | 5/2008 | Danilak |
| 2009/0307225 A1* | 12/2009 | Burnett ............... G06F 17/2229 |
| 2010/0017555 A1* | 1/2010 | Chang ................. G06F 12/0246 |
| | | 711/103 |
| 2010/0083247 A1 | 4/2010 | Kanevsky et al. |
| 2010/0332658 A1* | 12/2010 | Elyashev ................ G06F 9/505 |
| | | 709/226 |
| 2011/0099550 A1* | 4/2011 | Shafi ..................... G06F 11/323 |
| | | 718/102 |
| 2011/0307102 A1* | 12/2011 | Czamara .............. H05K 7/1497 |
| | | 700/277 |
| 2012/0059978 A1 | 3/2012 | Rosenband et al. |
| 2012/0158954 A1* | 6/2012 | Heffernan ............... H04L 43/04 |
| | | 709/224 |
| 2012/0317337 A1 | 12/2012 | Johar et al. |
| 2013/0081013 A1 | 3/2013 | Plondke et al. |
| 2013/0179624 A1 | 7/2013 | Lambert et al. |
| 2014/0181430 A1* | 6/2014 | Bruso ................... G06F 3/0616 |
| | | 711/156 |
| 2015/0160983 A1* | 6/2015 | Kulkarni ............. G06F 9/45558 |
| | | 709/226 |
| 2015/0295799 A1* | 10/2015 | Gayles .................. H04L 43/067 |
| | | 702/176 |

OTHER PUBLICATIONS

Srimugunthan, Gopinath K., "Distributed Wear levelling of Flash Memories", In Proceedings of A arXiv Preprint, arXiv:1302.5999, Feb. 25, 2013, 8 pages.

"International Search Report & Written Opinion Issued in PCT Application No. PCT/US2015/051290", Mailed Date: Dec. 8, 2015, 11 Pages.

"Second Written Opinion Issued in PCT Application No. PCT/US2015/051290", Mailed Date: Aug. 17, 2016, 6 Pages.

"International Preliminary Report on Patentability Issued in PCT Application No. PCT/US2015/051290", Mailed Date: Dec. 8, 2016, 7 Pages.

\* cited by examiner

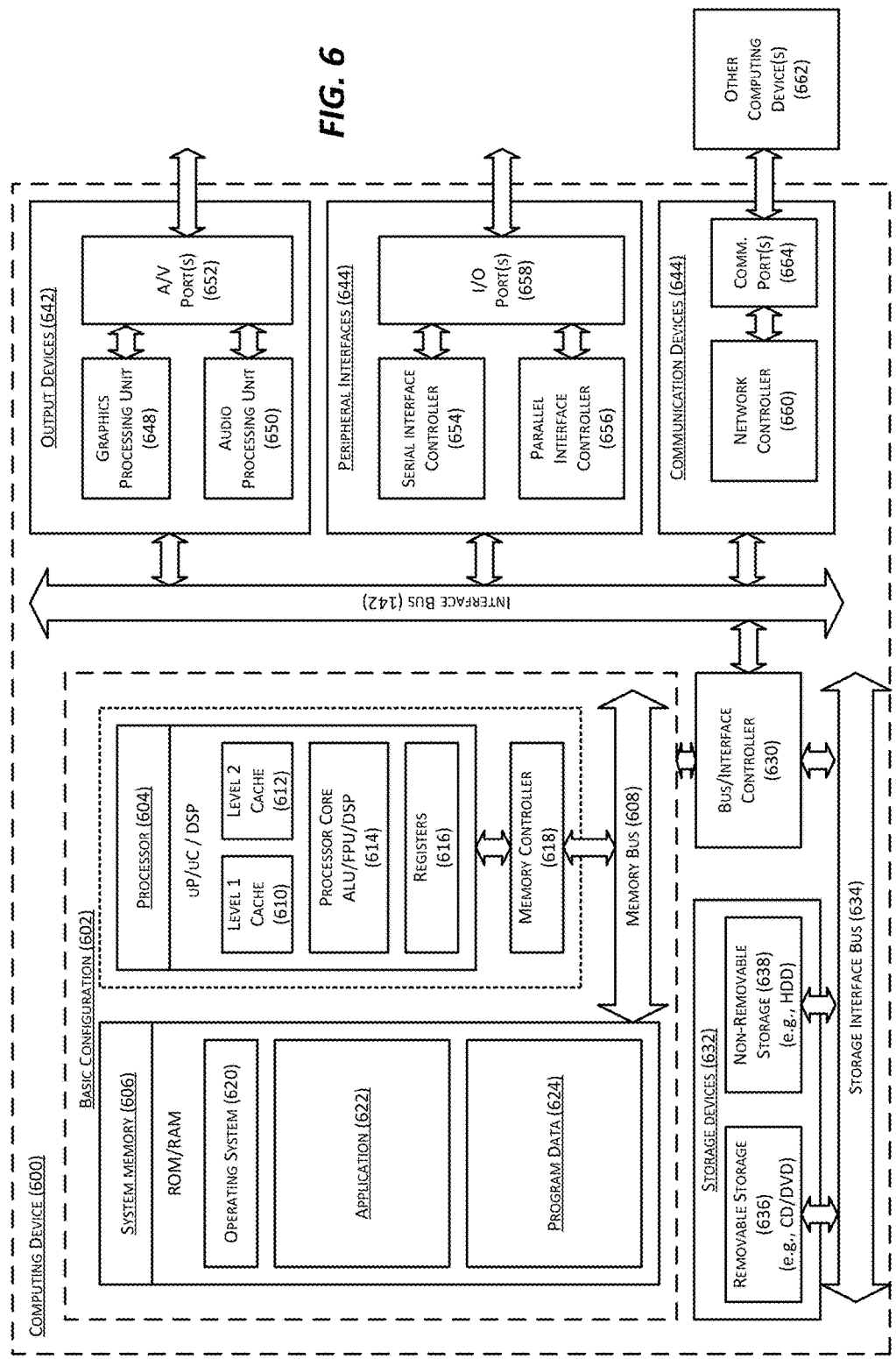

STORAGE DEVICE MANAGEMENT IN COMPUTING SYSTEMS

BACKGROUND

Network servers, personal computers, smartphones, and other computing devices typically include at least one storage device for holding data. Various types of storage devices are currently available. For example, one type includes hard disk drives ("HDDs"), optical disc drives (e.g., DVD-ROMs), and other kinds of electromechanical devices. Another type includes flash drives and other solid-state drives ("SSDs") without any moving parts.

SSDs typically have faster access speeds and higher tolerance to physical shocks than electromechanical devices. On the other hand, electromechanical devices typically cost less than SSDs at similar capacity levels. However, as semiconductor manufacturing techniques progress, the costs of manufacturing SSDs continue to fall. As a result, SSDs are now a feasible option for network storage and other storage applications.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In computing systems such as data centers, servers or other processing units can each include one or more storage devices (e.g., SSDs). Such storage devices can have a limited service life represented by, for instance, an endurance value (e.g., a time) after which reliable operations cannot be presumed. The inventors have recognized that the endurance of the storage devices coupled to different processing units may not decline at the same rate. For example, SSDs that perform more random writes can have endurance values that decline more rapidly than those performing reads. However, to ensure uninterrupted services by the computing system, most storage devices are typically selected based on the highest rate of decline.

Several embodiments of the present technology are directed to monitoring an endurance decline or consumption of storage devices in a computing system and determining if a particular storage device is being consumed excessively based on, for example, an expected consumption rate or remaining endurance. If the storage device is determined as being consumed excessively, one or more application programs executing or hosted on a server or processing unit corresponding to the storage device can be migrated to another processing unit in the computing system. Thus, storage devices in the computing system may be consumed more evenly than in conventional systems, and resulting in a smaller difference between the highest consumption rate and an average consumption rate of the storage devices. As a result, less expensive storage devices may be used in the computing system, or the same storage devices may be used for a longer period of time when compared to conventional systems.

BRIEF DESCRIPTION OF THE DRAWINGS

FIG. 6 is a computing device suitable for certain components of the computing framework in FIG. 1.

DETAILED DESCRIPTION

Figure 1:
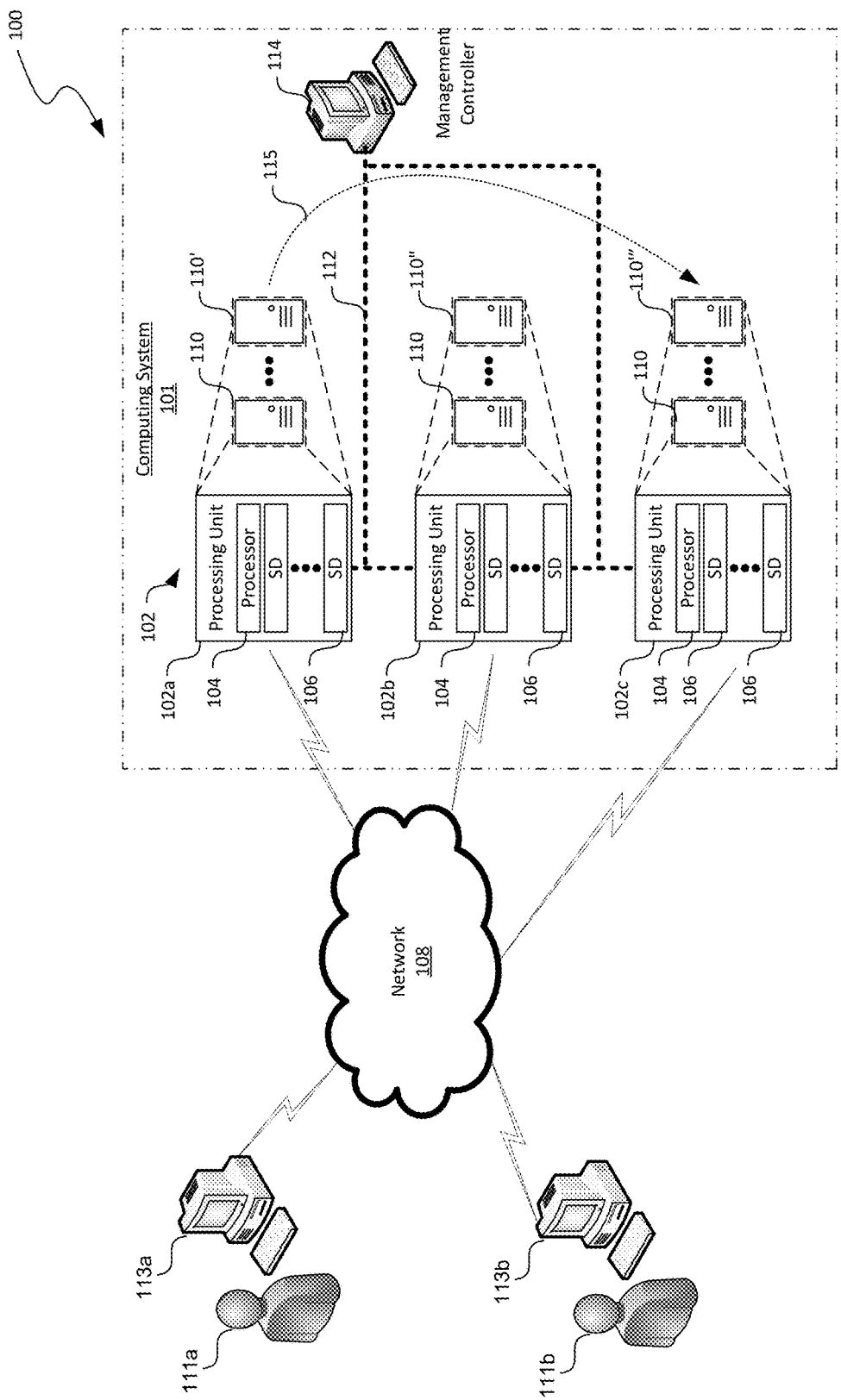
FIG. 1 is a schematic diagram illustrating a computing framework in accordance with embodiments of the present technology.

Various embodiments of computing systems, devices, components, modules, routines, and processes for managing storage devices in computing systems are described below. In the following description, example software codes, values, and other specific details are included to provide a thorough understanding of various embodiments of the present technology. A person skilled in the relevant art will also understand that the technology may have additional embodiments. The technology may also be practiced without several of the details of the embodiments described below with reference to FIGS. 1-6.

As used herein, the term "storage device" generally refers to an electronic apparatus configured to store digital information. Examples of storage devices include magnetic disk devices such as floppy disk drives and hard disk drives (HDD), optical disk drives such as compact disk (CD) drives or digital versatile disk (DVD) drives, SSDs, and tape drives. Storage devices can include one or more computer readable storage media. Examples of computer readable storage media include volatile or nonvolatile, removable or non-removable media implemented in any process or technology for storage of information, e.g., computer readable instructions, data structures, program modules, or other suitable data. As used herein, the terms "computer readable storage medium" and "storage device" exclude propagated signals, per se.

Also used herein, the term "processing unit" generally refers to an electrical or electronic device configured to perform logic comparisons, arithmetic calculations, electronic communications, electronic input/output, and/or other suitable functions. Example processing units can include computing systems (e.g., servers, desktop computers, laptop computers, etc.), computing devices (e.g., logic processors, network routers, network switches, network interface cards, data storage devices, etc.), or other suitable types of electronic apparatus. Embodiments of processing units can include one or more computing processors, one or more storage devices (e.g., SSDs), and/or other suitable electronic/mechanical components.

The term "endurance" generally refers to a limit (e.g., in time, in number of operations, etc.) at which operations (e.g., writes) of a storage device is no longer presumed to be reliable. For example, a storage device may have an endurance value of 2 petabytes written to the storage device. Thus, after 2 petabytes have been written to the storage device, additional writes, reads, and/or other operations of the storage device may no longer be reliable. Additional examples of endurance may be based on a number of writes, a number of reads, a number of erases, and/or other suitable parameters of the storage device. As used herein, a depletion of or decline in endurance of a storage device is generally referred to as consumption or wear.

Also used herein, the term "excessive consumption" of a storage device or that a storage device is being "consumed excessively" generally refers to a state in which a rate of decline in the endurance of the storage device exceeds a decline threshold, or a remaining endurance of the storage device is below an expected remaining endurance level. For example, the decline threshold (DT) can be an expected consumption rate based on a lifetime endurance and service life of the storage device as follows:

$$DT = \frac{\text{lifetime endurance value}}{\text{service life}}$$

The expected remaining endurance level (EREL) can be an endurance value based on the lifetime endurance, the service life, and a time in service of the storage device as follows:

$$EREL = \text{lifetime endurance value} \times \frac{\text{service life} - \text{time in service}}{\text{service life}}$$

In another example, the decline threshold can be an average or a median value of consumption rates of all or at least some storage devices in a computing system. In yet another example, the decline threshold or the remaining endurance level can each be a value input by an operator. In further examples, the decline threshold or the remaining endurance level can be any combinations of the foregoing values and/or other suitable values.

Storage devices in different processing units of a computing system may have different rates of consumption. However, in order to ensure uninterrupted services, most (if not all) storage devices in the computing system generally accommodate the highest rate of consumption. Several embodiments of the present technology are directed to monitoring consumption rates of the storage devices to enable migrating one or more application programs from a processing unit with an excessively consumed storage device to another processing unit in the computing system. As a result, storage devices in the computing system may wear generally evenly to reduce the highest rate of consumption, resulting in reduced capital costs for the storage devices, or the same storage devices may be used for a longer period of time before replacement.

FIG. 1 is a schematic diagram illustrating a computing framework 100 in accordance with embodiments of the present technology. As shown in FIG. 1, the computing framework 100 can include computing system 101 and a plurality of client devices 113 (shown individually as first and second client devices 113a and 113b, respectively) interconnected by a network 108. A plurality of users 111 (identified individually as first and second users 111a and 111b, respectively) may utilize corresponding client devices 113 to retrieve data from, execute application programs with, or otherwise interact with the computing system 101. Even though only the foregoing components are illustrated in FIG. 1, in other embodiments, the computing framework 100 can also include additional processing units, client devices, networking devices (e.g., routers, switches, bridges, etc.), and/or other suitable components.

In the illustrated embodiment shown in FIG. 1, the client devices 113 include desktop computers. In other embodiments, the client devices 113 can also include laptop computers, tablet computers, automobile consoles, smartphones, and/or other suitable computing devices configured for program execution, application sharing, data sharing, and/or other suitable computer-implemented operations. In one embodiment, the network 108 can be the Internet. In other embodiments, the network 108 can also include a personal area network, a local area network, a wide area network, a virtual private network, and/or other suitable types of network.

As shown in FIG. 1, the computing system 101 can include a plurality of processing units 102 and a management controller 114 interconnected to one another by a system network 112 (shown in phantom lines for clarity). The system network 112 can include an Ethernet network or other suitable types of network utilizing wired and/or wireless links. In the illustrated embodiment, three processing units 102a, 102b, and 102c are shown for illustration purposes. In other embodiments, the computing system 101 can include any suitable number of processing units 102 in any suitable arrangements.

The processing units 102 can each include a processor 104 and one or more storage devices 106 (shown as SDs 106 in FIG. 1) operatively coupled to the processor 104. The individual processing units 102 can be configured to interact with the users 111 via the client devices 113. For example, as shown in FIG. 1, the storage devices 106 can include computer instructions that when executed by corresponding processor 102 cause the processor 102 to run one or more virtual machines 110 for one or more of the users 111. In another example, the storage devices 106 may contain user data (e.g., emails, photos, videos, etc.) that are retrievable via the network 108. In further examples, the storage devices 106 may also contain user application programs (e.g., word processors, text editors, spreadsheet applications, email applications, computer games, mobile applications, etc.) for execution by the corresponding processors 104. In yet further examples, the storage devices 106 may contain a combination of the foregoing data or other user-related information.

The management controller 114 is configured to manage consumption of the storage devices 106 in the individual processing units 102. In certain embodiments, the management controller 114 can be configured to receive consumption data of the storage devices 106 from the processing units 102 and determine if a storage device 106 is being consumed excessively. If the storage device 106 is determined to be consumed excessively, the management controller 114 can then be configured to generate an indicator for potential program migration from the processing unit 102 with the excessively consumed storage device 106 to another processing unit 102. In other embodiments, the management controller 114 can also cause the program migration automatically. In further embodiments, the management controller 114 may also be configured to store related consumption data, marking certain processing units 102 as being suitable for migration, and/or other suitable operations. Even though the management controller 114 is shown in FIG. 1 as a desktop computer, in other embodiments, the management controller 114 can include one of the processing units 102, one of the virtual machines 110 hosted by one of the processing units 102, a service executing on one of the virtual machines 110, or other suitable computing devices. Example components of the management controller 114 are described below in more detail with reference to FIGS. 2 and 3.

As shown in FIG. 1, the users 111 can individually execute application programs, retrieve user data, and/or perform other suitable operations facilitated by the computing system 101. For example, the first user 111a may use the client device 113a to request editing a previously stored document (not shown). In response, the computing system 101 may instantiate a virtual machine 110, for example, the virtual machine 110' on the processing units 102a, retrieve the stored document from one of the storage devices 106 of the processing unit 102a, and execute a word processor to load the retrieved document. In another example, the second user 111b may use the client device 113b to request retrieval of user photo data stored in the computing system 101. In response, the computing system 101 can instantiate another virtual machine 110" on the processing unit 102b, retrieve the requested photo data from one of the storage devices 106, and return the retrieved photo data to the client device 113b via the network 108.

The inventors have recognized that certain user operations (e.g., random writes) may cause the storage devices 106 be consumed more rapidly than other operations (e.g., reads, sequential writes, etc.). For instance, continuing with the previous example, the first user 111a may edit the document by deleting and/or inserting words in random locations in the document. Such actions may cause random writes to be performed to the storage device 106 holding the document. Because certain storage devices 106 (e.g., SSDs) can only be written in blocks of data, the random writes may cause additional data of the document to be read, erased, or moved before the random writes can be completed. As a result, random writes may cause a greater number of bits to be written to the storage devices 106 than the number of bits from the word processor. In contrast, reads typically would not consume, or consume very little, the storage devices 106. Thus, the storage devices 106 coupled to the processing unit 102a serving the first user 111a may be consumed more than those coupled to the processing unit 102b serving the second user 111b.

In operation, the management controller 114 can receive input from the processing units 102 containing consumption data of the storage devices 106 that are associated with the individual processing units 102. In certain embodiments, the management controller 114 can be configured to transmit a request to the processing units 102 for the consumption data and in response receive the input form the processing units on a periodic, continuous, or other suitable basis. In other embodiments, the processing units 102 can report the consumption data without receiving a request from the management controller 114. In further embodiments, the individual storage devices 106 may be individually polled for or independently report the consumption data without prompting. In yet further embodiments, any combinations of the foregoing operating modes may be implemented.

In response to receiving the input of consumption data, the management controller 114 can analyze the consumption data to determine if a particular storage device 106 has been consumed excessively. In certain embodiments, the storage devices 106 can each have an expected consumption rate. For example, a storage device 106 may originally have a lifetime endurance value of 2 petabytes written and a useable life span of 3 years. Thus, after 1.5 years, the storage device 106 is expected to have 1 petabytes consumed and a remaining endurance of 1 petabytes written. As a result, in one embodiment, if the storage device 106 only has 0.95 petabytes written remaining, then the management controller 114 may indicate that the storage device 106 has been consumed excessively. In another embodiment, if the storage device 106 has 1.5 petabytes remaining, the management controller 110 may generate a suitability indicator marking the processing unit 102 as being suitable for migration. In other embodiments, the management controller 110 may store the results of comparison and/or related data or perform other suitable operations.

In other embodiments, the management controller 114 may indicate excessive consumption if a consumption variation based on the expected consumption rate exceeds a threshold. For instance, in the previous example, if the storage device 106 only has 0.8 petabytes, then the consumption variation would be 0.2 petabytes. If the threshold is 0.1 petabytes (or 10% of the original endurance value), then the consumption variation (0.2 petabytes) exceeds the threshold (0.1 petabytes). Accordingly, management controller 114 may indicate excessive consumption of the storage device 106. Otherwise, in certain embodiments, the management controller 110 may generate a suitability indicator marking the processing unit 102 as being suitable for migration. In other embodiments, the management controller 110 may store the results of comparison and/or related data.

In further embodiments, the management controller 114 may indicate a plurality of levels of excessive consumption (e.g., based on different thresholds) of the storage device 106. For instance, continuing with the previous example, the management controller 114 may have three threshold levels at 10%, 20%, and 30% of the original endurance value. Thus, as the storage device 106 continues to be consumed, the management controller 114 may generate different indicators of excessiveness by comparing the consumption variation with each threshold levels, as discussed above. If at least one of the thresholds is not exceeded, the management controller 110 may generate a suitability indicator or perform other suitable operations as discussed above.

Based on the generated indicator of excessive consumption, the computing system 101 can migrate one or more application programs from one processing unit 102 to another. For example, if the management controller 114 indicates that the storage device 106 of the processing unit 102a is consumed excessively, the computing system 101 may migrate the virtual machine 110' associated with the first user 111a to the processing unit 102c, for example, by instantiating another virtual machine 110''', as indicated by the arrow 115. In one embodiment, the target processing unit 102c can be selected based at least on a physical proximity to the originating processing unit 102a. In other embodiments, the target processing unit 102c may be selected based on least service interruption, availability of computing capacity, and/or other suitable criteria. In certain embodiments, the management controller 114 can be configured to cause the migration. In further embodiments, other servers, drivers, controllers, or suitable components of the computing system 101 can be configured to cause the migration.

In certain embodiments, the management controller 114 (or other suitable components of the computing system 101) may verify that the target processing unit 102c is suitable for the migration. In one embodiment, the management controller 114 can request consumption data from the storage devices 106 of the processing unit 102c and perform an analysis as discussed above. In another embodiment, the management controller 114 can verify a value of a migration indicator associated with the processing unit 102c. In further embodiments, the management controller 114 may perform other suitable operations in conjunction with the verification.

By causing migration of the one or more application programs associated with a processing unit 102 with excessively consumed storage devices 106, several embodiments of the computing system 101 can reduce a consumption variability among storage devices 106 in different processing units 102. For example, in the example above, by migrating the virtual machine 110' from the processing unit 102a, the consumption rate of the storage devices 106 in the processing unit 102a may be at least reduced from that before the migration. Thus, storage devices 106 in the processing units 102a and 102c may be consumed more evenly than without the migration. As a result, a maximum consumption rate of the storage devices 106 may be reduced when compared to conventional techniques, and more inexpensive storage devices 106 may be used in the computing system 101.

Figure 2:
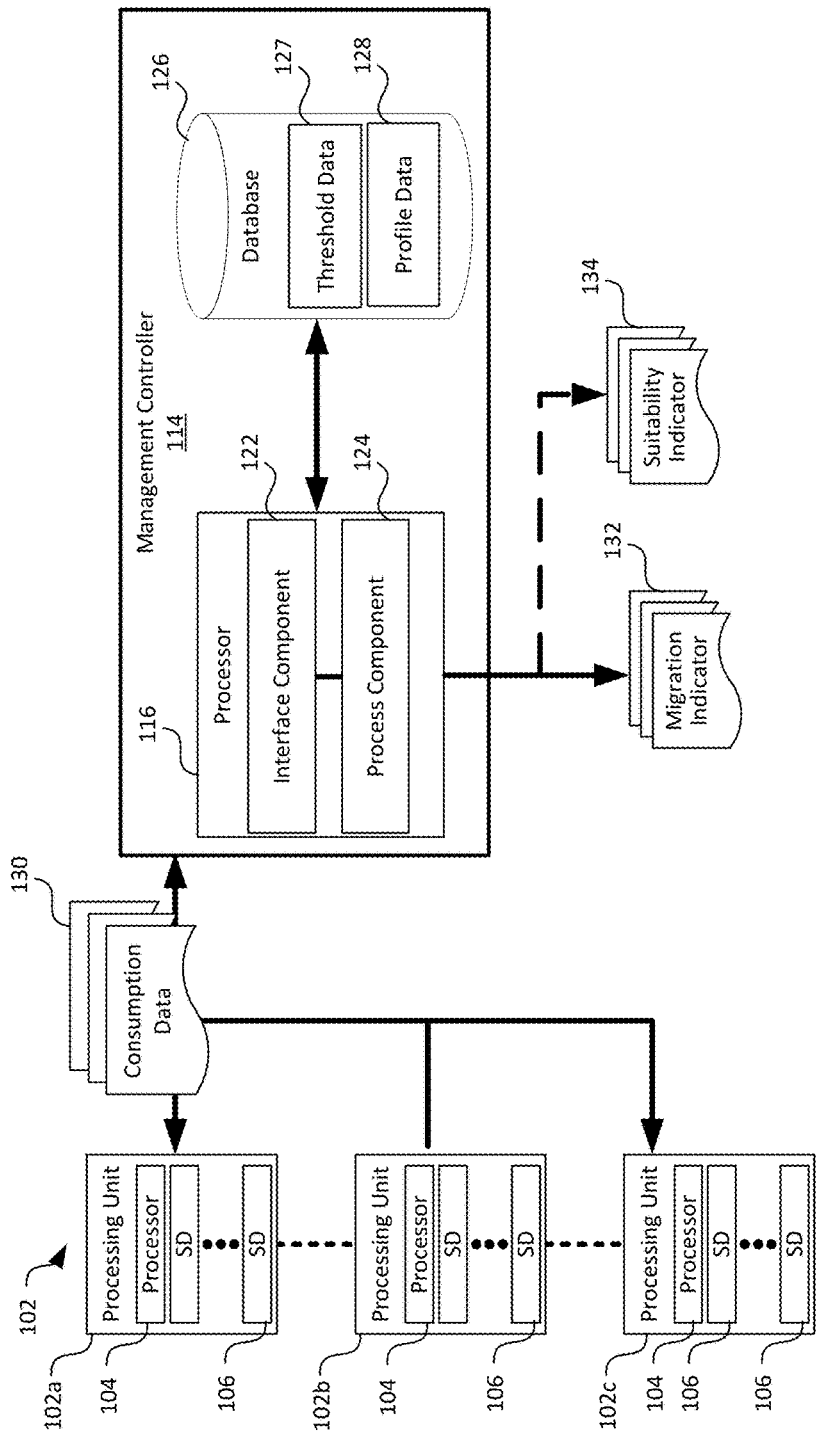
FIG. 2 is a block diagram illustrating computing components suitable for the management controller of FIG. 1 in accordance with embodiments of the present technology.

FIG. 2 is a block diagram showing computing components suitable for the management controller 114 in FIG. 1. In FIG. 2 and in other Figures hereinafter, individual software components, modules, and routines may be a computer program, procedure, or process written as source code in C, C++, Java, and/or other suitable programming languages. The computer program, procedure, or process may be compiled into object or machine code and presented for execution by a processor of a personal computer, a network server, a laptop computer, a smart phone, and/or other suitable computing devices. Various implementations of the source and/or object code and associated data may be stored in a computer memory that includes read-only memory, random-access memory, magnetic disk storage media, optical storage media, flash memory devices, and/or other suitable storage media that do not include propagated signals.

As shown in FIG. 2, the management controller 114 can include a processor 116 operatively coupled to a database 126 containing threshold data 127 and/or profile data 128 related to the storage devices 106. The threshold data 127 can include a decline threshold, an expected remaining endurance level, and/or other suitable threshold parameters related to the consumption of the storage devices 106. The profile data 128 can include a lifetime endurance value, a service life, a time in service, a model number, a serial number, and/or other suitable information related to the storage devices 106. In the illustrated embodiment, the profile data 128 is shown as being contained in the database 126. In other embodiments, the profile data 128 may be contained in the individual storage devices 106 and retrievable by the management controller 114 via an application programming interface and/or other suitable interfaces.

As shown in FIG. 2, the processor 116 can include an interface component 122 and a process component 124 operatively coupled together. In the illustrated embodiment, the database 126 is shown as a part of the management controller 114. In other embodiments, the database 126 may be remote to the management controller 114. Even though only certain components of the management controller 114 are shown in FIG. 2, in further embodiments, the management controller 114 may also include an input component, an output component, and/or other suitable components.

The interface component 122 can be configured to receive consumption data 130 of the storage devices 106 from the processing units 102. In one embodiment, the interface component 122 can include an application programming interface. In other embodiments, the interface component 122 can include a communication driver, a network driver, and/or other suitable component. The interface component 122 is also configured to forward the received consumption data 130 for further analysis by the process component 124.

In certain embodiments, the consumption data 130 can include at least one of a remaining endurance value, a consumed endurance value, a percent endurance remaining, a percent endurance consumed, and/or other suitable consumption values of the storage devices 106. For example, the consumption data 130 can include a number of terabit remaining associated with a particular storage device 106. In another example, the consumption data 130 can include a number of petabytes already performed associated with a particular storage device 106. In further examples, the consumption data 130 can include percentages of consumed or remaining storage capacities associated with a particular storage device 106.

In certain embodiments, the process component 124 can be configured to generate the threshold data 127 based on the profile data 128. For example, the process component 124 can calculate a decline threshold and/or an expected remaining endurance level as discussed above. In other example, the process component 124 can calculate other suitable threshold values. In other embodiments, the threshold data 127 may be generated by other suitable computing devices (not shown) and stored in the database 126. In yet other embodiments, the threshold data 127 may be input by an operator.

The process component 124 can also be configured to receive and analyze the consumption data 130 from the interface component 122 and determine if any storage device 106 is consumed excessively based on, for example, the threshold data 127 and/or the profile data 128 associated with the storage devices 106. In response to determining that a storage device 106 is being consumed excessively, the process component 124 can be configured to generate a migration indicator 132; otherwise, in certain embodiments, the process component 124 can be configured to generate an optional suitability indicator 134 associated with processing units 102 with storage devices 106 not consumed excessively. Example software modules of the process component 124 are described in more detail below with reference to FIG. 3.

Figure 3:
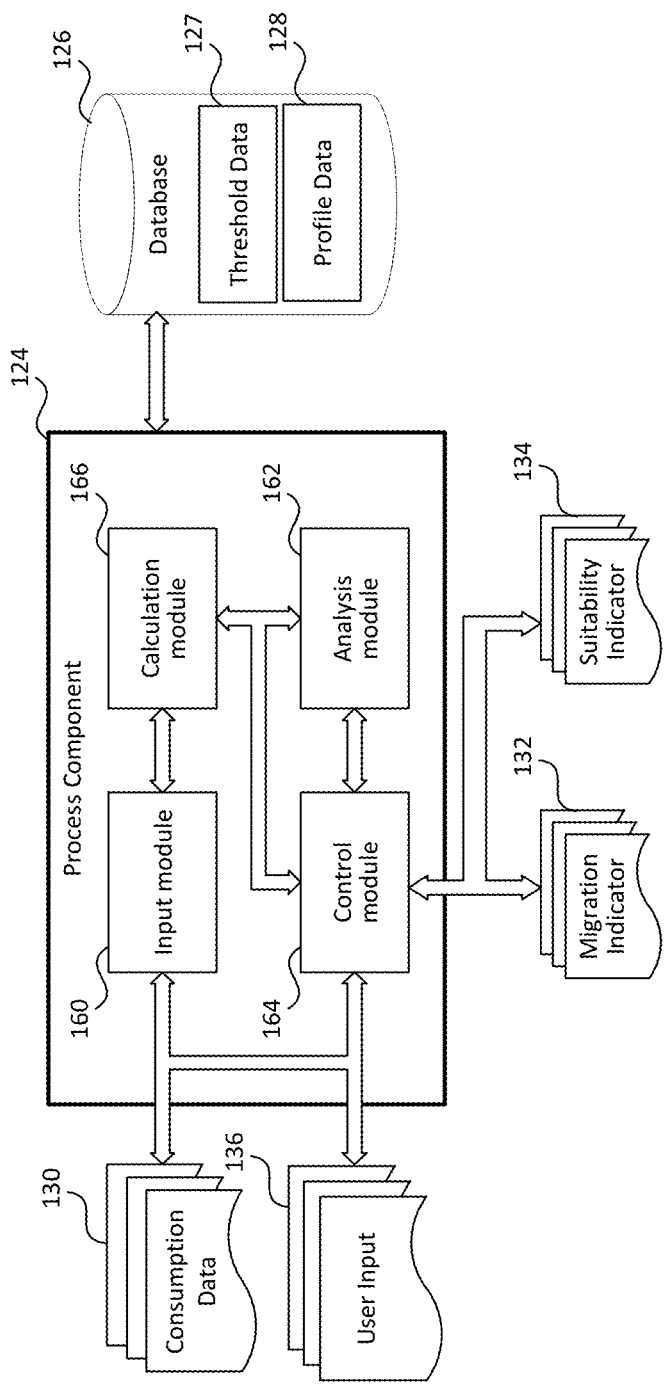
FIG. 3 is a block diagram illustrating software modules suitable for the process component of FIG. 2 in accordance with embodiments of the present technology.

FIG. 3 is a block diagram showing example software modules suitable for the process component 124 of FIG. 2 in accordance with embodiments of the present technology. As shown in FIG. 3, the process component 124 can include an input module 160, an analysis module 162, a control module 164, and a database module 166 interconnected with one other. Each of the modules 160, 162, 164, and 166 can be a computer program, procedure, or routine written as source code in a conventional programming language, or one or more modules may be hardware modules.

The input module 160 is configured to receive the consumption data 130 and then transmits the received consumption data 130 to the analysis module 162 and/or the calculation module 166. The calculation module 166 may include routines configured to perform various types of calculations to facilitate operations of other modules. For example, in certain embodiments, the calculation module 166 can include routines configured to calculate one or more of a decline threshold, an expected remaining endurance level, and/or other suitable threshold values as discussed above. The calculation results may be stored in the database 126 as the threshold data 127. In other embodiments, calculation module 166 can be configured to calculate a consumption rate of a storage device 106 (FIG. 2) based on the consumption data 130 representing a remaining endurance value and the time in service as follows:

$$\text{consumption rate} = \frac{(\text{lifetime endurance} - \text{remaining endurance})}{\text{time in service}}$$

In further embodiments, the calculation module 166 can also include can include linear regression, polynomial regression, interpolation, extrapolation, and/or other suitable subroutines to perform other suitable calculations related to the consumption of the storage device 106.

The analysis module 162 can be configured to compare the consumption rate of the storage device 106 with a decline threshold (e.g., an expected consumption rate). In one embodiment, if the consumption rate exceeds the expected consumption rate, the analysis module 162 may indicate excessive consumption of the storage device 106. In another embodiment, the calculation module 166 can be configured to calculate a consumption variation (CV) between the calculated consumption rate (CCR) and the expected consumption rate (ECR) as follows:

$$CV=ABS(CCR-ECR)$$

If the consumption variation exceeds a threshold, then the analysis module 162 may indicate excessive consumption. In further embodiments, the analysis module 162 can be configured to indicate different levels of excessive consumption based on different thresholds, as discussed above with reference to FIG. 1. In any of the foregoing embodiments, the analysis module 162 can indicate suitability of the processing unit 102 with the storage device 106 as a target of migration if the storage device 106 is not consumed excessively.

The control module 164 can be configured to generate the migration indicator 132 and/or the suitability indicator 134 based on results of the analysis from the analysis module 162. For example, in one embodiment, if the analysis module 162 indicates excessive consumption, the control module 164 can generate the migration indicator 132; otherwise, the control module 164 can generate the suitability indicator 134. In other embodiments, the control module 164 may cause migration of one or more application programs if the analysis module 162 indicates excessive consumption. In further embodiments, the control module 164 may cause the processing unit 102 with the excessively consumed storage device 106 to remotely access one or more storage devices 106 in another processing unit 102. In yet further embodiments, the control module 164 may perform any combinations of the foregoing operations based on results of analysis from the analysis module 162.

Figure 4:
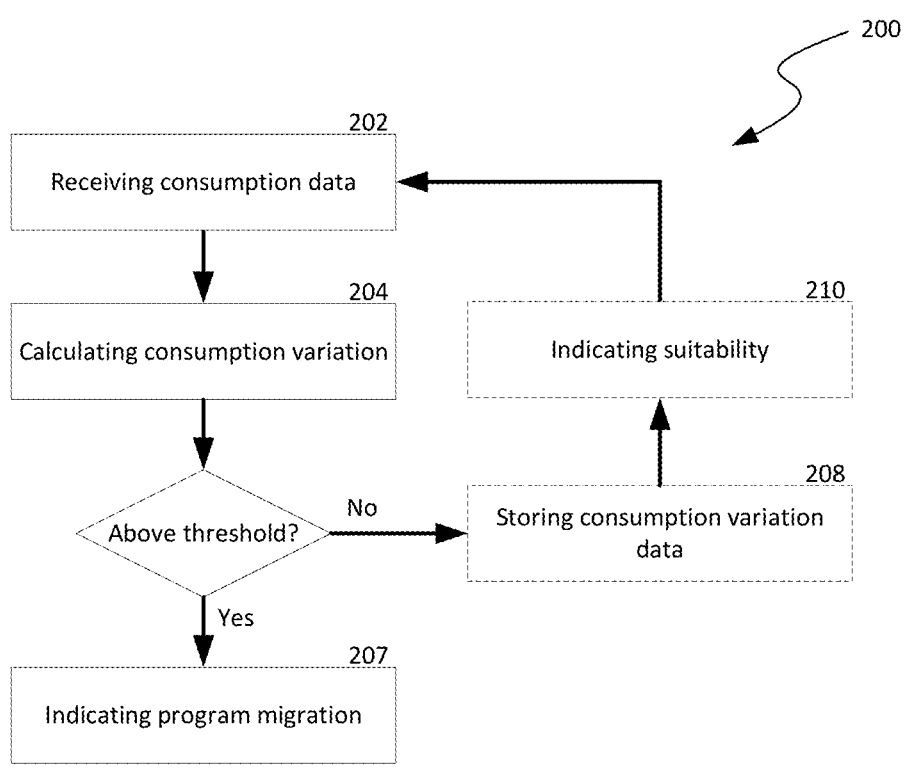
FIG. 4 is a flow diagram illustrating a process of managing storage devices in a computing system in accordance with embodiments of the present technology.

FIG. 4 is a flow diagram illustrating a process 200 for managing storage devices in a computing system in accordance with embodiments of the present technology. As shown in FIG. 4, the process 200 can include receiving consumption data at stage 202. The consumption data can include at least one of a remaining endurance, consumed endurance, percent endurance remaining, percent consumed endurance, and/or other suitable consumption profiles of a storage device such as one of the storage devices 106 in FIG. 1.

The process 200 then include calculating a consumption variation based on the received consumption data and an expected consumption rate at stage 204. In one embodiment, an operator may set the expected consumption rate. In another embodiment, the expected consumption rate may be calculated based on a lifetime endurance, a time in service, and a service life associated with the storage device, as discussed above with reference to FIG. 3. In other embodiments, the consumption variation may also be derived based on an average consumption rate of all or at least several of the storage devices 106 in the computing system 101. In yet further embodiments, the consumption variation may be derived based on a combination of the foregoing techniques and/or other suitable techniques.

The process 200 can then include determining if the calculated consumption variation is above a threshold at stage 206. If the consumption variation is above the threshold, the process 200 includes indicating a potential program migration at stage 207. If the consumption variation is not above the threshold, the process 200 can optionally include storing the calculated consumption variation data in, for example, the database 126 of FIG. 2 at stage 208 and/or indicating a suitability of the processing unit having the storage device as a suitable migration target at stage 210.

Figure 5:
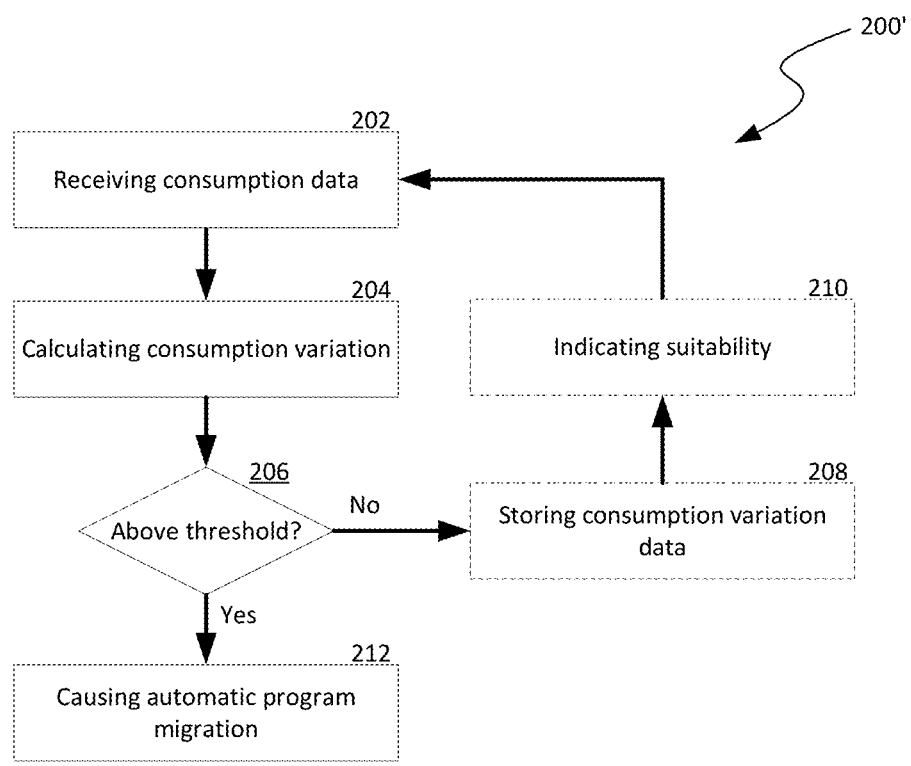
FIG. 5 is a flow diagram illustrating another process of managing storage devices in a computing system in accordance with embodiments of the present technology.

FIG. 5 is a flow diagram illustrating another process 200' of managing storage devices in a computing system in accordance with embodiments of the present technology. As shown in FIG. 5, the process 200' can include operations generally similar to those of the process 200 in FIG. 4 except that if the consumption variation is above the threshold, the process 200' includes causing automatic migration of one or more application programs from the processing unit with the excessively consumed storage device to another processing unit in the computing system at stage 212.

FIG. 6 is a computing device 600 suitable for certain components of the computing framework 100 in FIG. 1. For example, the computing device 600 may be suitable for the processing unit 102 and/or the management controller 114 of FIG. 1. In a very basic configuration 602, computing device 600 typically includes one or more processors 604 and a system memory 606. A memory bus 608 may be used for communicating between processor 604 and system memory 606.

Depending on the desired configuration, the processor 604 may be of any type including but not limited to a microprocessor (pP), a microcontroller (pC), a digital signal processor (DSP), or any combination thereof. The processor 604 may include one more levels of caching, such as a level-one cache 610 and a level-two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations, memory controller 618 may be an internal part of processor 604.

Depending on the desired configuration, the system memory 606 may be of any type including but not limited to volatile memory (such as RAM), non-volatile memory (such as ROM, flash memory, etc.) or any combination thereof. The system memory 606 may include an operating system 620, one or more applications 622, and program data 624. This described basic configuration 602 is illustrated in FIG. 6 by those components within the inner dashed line.

The computing device 600 may have additional features or functionality, and additional interfaces to facilitate communications between basic configuration 602 and any other devices and interfaces. For example, a bus/interface controller 630 may be used to facilitate communications between the basic configuration 602 and one or more data storage devices 632 via a storage interface bus 634. The data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 606, removable storage devices 636, and non-removable storage devices 638 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which may be used to store the desired information and which may be accessed by computing device 600. Any such computer readable storage media may be a part of computing device 600.

The computing device 600 may also include an interface bus 640 for facilitating communication from various interface devices (e.g., output devices 642, peripheral interfaces 644, and communication devices 646) to the basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 600 may also be implemented as a personal computer including both laptop computer and non-laptop computer configurations.

Specific embodiments of the technology have been described above for purposes of illustration. However, various modifications may be made without deviating from the foregoing disclosure. In addition, many of the elements of one embodiment may be combined with other embodiments in addition to or in lieu of the elements of the other embodiments. Accordingly, the technology is not limited except as by the appended claims.

We claim:

1. A computing device having a processor and a memory containing instructions that when executed by the processor, cause the processor to perform a process comprising:
receiving an input from a first processing unit of a computing system, the first processing unit executing one or more application programs with a processor, wherein the input containing data representing a number of operations previously performed by a storage device of the first processing unit; determining if the number of operations of the storage device of the first processing unit is excessive in relation to a target threshold; and in response to determining that the number of operations of the storage device of the first processing unit is excessive, migrating one or more of the application programs from the first processing unit to a second processing unit in the computing system, wherein the process performed by the processor further includes determining the target threshold based on an endurance of the storage device and a time that the storage device is in service.

2. The computing device of claim 1 wherein the one or more application programs includes one or more virtual machines, and wherein migrating one or more of the application programs includes migrating one or more of the virtual machines from the first processing unit to the second processing unit.

3. The computing device of claim 1 wherein the number of operations previously performed by the storage device includes an accumulated number of reads, writes, and/or erases previously committed to the storage device, and wherein determining if the number of operations to the storage device of the first processing unit is excessive includes determining if the number of reads, writes, and/or erases previously committed to the storage device is above the target threshold.

4. The computing device of claim 1 wherein: the number of operations previously performed by the storage device includes an accumulated number of writes previously committed to the storage device; and the process performed by the processor further includes: calculating a percentage of excess in the number of writes previously committed to the storage device based on an expected number of writes; and comparing the calculated percentage of excess to the target threshold.

5. The computing device of claim 1 wherein: the number of operations previously performed by the storage device includes an accumulated number of writes previously committed to the storage device; and the process performed by the processor further includes: calculating a percentage of excess in the number of writes previously committed to the storage device based on an expected number of writes; determining if the calculated percentage of excess is larger than the target threshold; and in response to determining that the percentage of excess is larger than the target threshold, indicating that the number of operations to the storage device of the first processing unit is excessive.

6. The computing device of claim 1 wherein: the number of operations previously performed by the storage device includes an accumulated number of writes previously committed to the storage device; and the process performed by the processor further includes: calculating a percentage of excess in the number of writes previously committed to the storage device based on an expected number of writes; determining if the calculated percentage of excess is larger than the target threshold; and in response to determining that the percentage of excess is not larger than the target threshold, performing at least one of indicating that the number of operations to the storage device of the first processing unit is not excessive; or marking the processing unit as suitable as a migrate target.

7. A method of managing storage devices in a computing system having a plurality of servers interconnected with one another via a computer network, the servers individually having a processor and one or more storage devices operatively coupled to the processor, the method comprising: receiving, from one of the servers via the computer network, an input containing consumption data representing a consumption status of a storage device coupled to a processor of one of the servers, wherein the storage device is accessed by the processor when executing instructions to host a virtual machine on the one of the servers; determining whether the storage device coupled to the one of the servers is consumed excessively based on an expected consumption rate of the storage device and the received consumption status of the storage device from the one of the servers, wherein the expected consumption rate is determined based on an endurance of the storage device and a time that the storage device is in service; and in response to determining that the storage device is consumed excessively, causing the virtual machine currently hosted on the one of the servers to migrate, via the computer network, from the one of the servers to be hosted by another one of the servers in the computing system.

8. The method of claim 7 wherein determining whether the storage device in the one of the processing units is consumed excessively includes: calculating a consumption variation based on the received consumption data and the expected consumption of the storage device; determining whether the calculated consumption variation associated with the storage device is above a threshold; and in response to determining that the calculated consumption variation is above the threshold, indicating that the storage device is consumed excessively.

9. The method of claim 8 wherein calculating the consumption variation of the storage device includes calculating at least one of a difference between the received consumption data and the expected consumption of the storage device or a percentage of excess consumption above the expected consumption of the storage device.

10. The method of claim 8 wherein calculating the consumption variation of the storage device includes calculating the expected consumption based on a life endurance of the storage device and a time in service of the storage device.

11. The method of claim 8 wherein calculating the consumption variation of the storage device includes: calculating an expected remaining endurance of the storage device by multiplying a life endurance of the storage device and a time in service of the storage device; and calculating a percentage of excess consumption based on the calculated remaining endurance and the data representing the consumption of the storage device.

12. The method of claim 7 wherein the computing system includes a data center.

13. The method of claim 7, further comprising: in response to determining that the storage device is consumed excessively, selecting the another one of the servers of the computing system based on a consumption status of a storage device on the another server; and automatically migrating the virtual machine from the one of the servers to the selected another server via the computer network.

14. The method of claim 7, further comprising: in response to determining that the storage device is consumed excessively, selecting the another one of the servers of the computing system based at least in part on a physical proximity of the another one of the servers to the one of the servers; and automatically migrating the virtual machine from the one of the servers to the selected another one of the servers via the computer network.

15. The method of claim 7 wherein: in response to determining that the storage device is consumed excessively, selecting a storage device coupled to the another one of the servers of the computing system; and allowing the processor of the one of the servers to access the selected storage device of the another one of the servers via the computer network.

16. A method of managing storage devices in a computing system having a plurality of servers interconnected with one another via a computer network, the servers individually having a processor and a storage device operatively coupled to the processor, the method comprising: receiving, from a first server of the computing system via the computer network, an input containing consumption data representing a consumption status of a storage device coupled to a first processor of the first server, wherein the storage device is accessible by the first processor when executing instructions of an application on the first server; determining whether the storage device coupled to the first processor of the first server is consumed excessively based on a comparison between the received consumption data of the storage device and a projected consumption rate of the storage device, wherein the projected consumption rate is determined based on an endurance of the storage device and a time that the storage device is in service; and in response to determining that the storage device of the first server is consumed excessively, causing the application currently being executed by the first processor of the first server to migrate, via the computer network, from the first server to a second server in the computing system to be executed by a second processor of the second server.

17. The method of claim 16 wherein determining whether the storage device coupled to the first processor of the first server is consumed excessively includes: calculating an average rate of consumption of all storage devices in the servers of the computing system; and determining a variation of rate of consumption for the storage device of the first server from the calculated average rate of consumption.

18. The method of claim 16 wherein determining whether the storage device coupled to the first processor of the first server is consumed excessively includes: calculating an average rate of consumption of all storage devices in the servers of the computing system; determining a variation of rate of consumption for the storage device of the first server from the calculated average rate of consumption determining whether the variation of rate of consumption is greater than a threshold; and in response to determining that the variation of rate of consumption is greater than the threshold, indicating that the storage device of the first server is consumed excessively relative to the other storage devices in the computing system.

19. The method of claim 16 wherein determining whether the storage device coupled to the first processor of the first server is consumed excessively includes: calculating an average rate of consumption of all storage devices in the computing system; determining a percentage of variation for the storage device of the first server based on the calculated average rate of consumption; determining whether the percentage of variation is greater than a threshold; and in response to determining that the percentage of variation is greater than the threshold, indicating that the storage device of the first server is consumed excessively relative to the other storage devices in the computing system.

\* \* \* \* \*